July 2, 1935.  C. R. MUELLER  2,006,840
HEATING DEVICE FOR MOTOR VEHICLES
Filed March 14, 1929
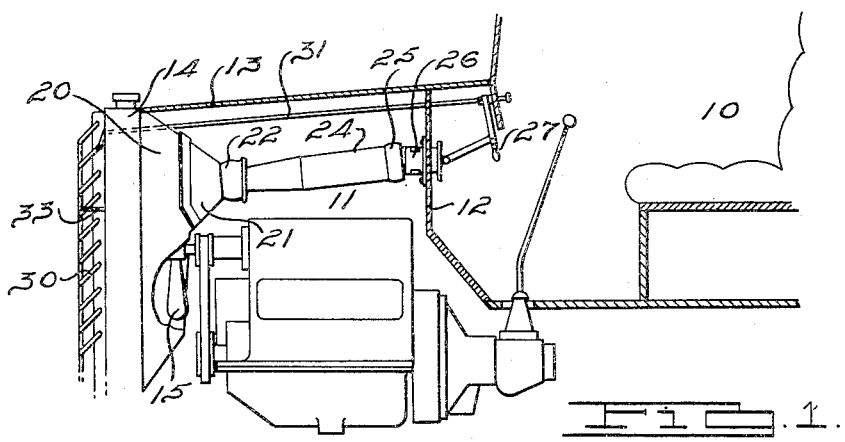
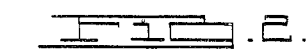
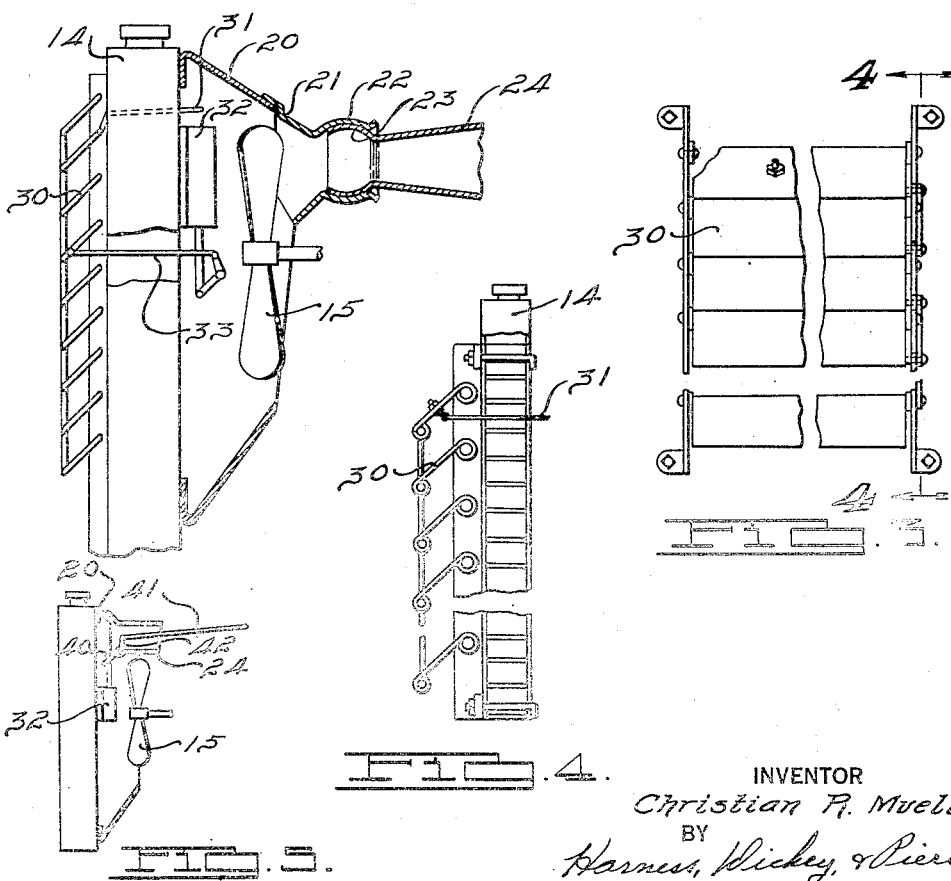
INVENTOR
Christian R. Mueller.
BY
Harness, Dickey, & Pierce.
ATTORNEYS.

Patented July 2, 1935

2,006,840

UNITED STATES PATENT OFFICE 2,006,840

HEATING DEVICE FOR MOTOR VEHICLES

Christian R. Mueller, Detroit, Mich.

Application March 14, 1929, Serial No. 346,848

4 Claims. (Cl. 237—12.3)

One object of my invention is to provide means for heating the passenger compartment of a motor vehicle by the introduction of heated air in sufficient volume into the vehicle, to produce a constant air change therein, rather than by the method of transferring heat by convection from a heated element to the relatively stationary air content of the body.

Another object of my invention is to utilize the heat loss of the engine cooling water for heating the vehicle body, without materially interfering with the cooling of the water.

Another object of my invention is to produce means for taking heated air directly from the radiator core into the vehicle body without interference of or mixture with the air currents present in the engine compartment of the vehicle, and without materially affecting the function of the radiator in cooling the circulating water.

Another object of my invention is to provide means for passing air heated by the radiator directly into the body without materially restricting the volume of air passing through any given portion of the radiator during passage to the body and with a minimum of resistance to the natural direction of flow induced by movement of the vehicle.

Another object of my invention is to provide simple, cheap and easily applied means of an accessory nature for effecting the above objects.

Another object of my invention is to provide means for effecting said objects which are adjustable to regulate the volume of air taken from the radiator core.

With these and other objects in view, my invention consists in the arrangement, combination and construction of the various parts of my improved device as described in the specification, claimed in my claims, and shown in the accompanying drawing, in which:

Fig. 1 is a fragmentary side elevation of the forepart of the motor vehicle, having parts in section and disclosing the forward portion of the passenger compartment, the engine compartment, and the radiator of the vehicle in which my device is installed.

Fig. 2 is an enlarged vertical section of parts shown in Fig. 1 and embodying automatic means for controlling the radiator shutters employed in conjunction therewith.

Fig. 3 is a fragmentary front elevation of radiator shutters which may be employed in connection with my device.

Fig. 4 is a view taken on the line 4—4 of Fig. 3.

Fig. 5 is a vertical sectional view of a modification of my device and showing diagrammatically the application of automatic means for regulating the air intake.

I am aware that heating devices for a vehicle body have been contrived in a number of different forms, the principal ones of which are those in which the heated air is passed over the exhaust manifold and so into the body, or in which the heat of the exhaust gases is transferred to an element in contact with the body atmosphere and transferred from that element to the body atmosphere by convection. All of the heating devices employing the utilization of the exhaust manifold or gases are objectionable, chiefly because they heat the air passing into contact therewith to such a degree as to carbonize the dust particles in the air, thereby producing a decidedly unpleasant odor in the car, and in most of them there is the ultimate danger of leakage of exhaust gases on account of defective or worn joints, into the body of the car, which is not only unpleasant, but may become decidedly dangerous on account of the poisonous gases contained in the exhaust. Another type of heater embodies the circulation of the cooling water of the engine in heat transfer elements within the body. This also involves the transfer of heat to the body atmosphere by convection, which is slow to operate and unsatisfactory, and such apparatus is expensive to install. Other attempts have been made to utilize the warm air leaving the radiator to heat the body, but have been unsatisfactory in practice for the reason that they permit a leakage of the oil laden air from the engine compartment into the body, giving rise to unpleasant odors, and by reason of its lower temperature, reducing the temperature of the air passing directly from the radiator core. Other attempts to utilize the radiator air are unsatisfactory because they involve crowding the volume of air leaving the radiator into a small conduit, and also conducting the air in a devious path from the radiator to the body, which so reduces the volume and temperature of the air that ultimately reaches the body that it is insufficient to heat the passenger compartment.

Ample heat may be obtained from the radiator alone to heat the passenger compartment so long as the air conduit and its connection with the radiator are of sufficient size to accumulate and convey the necessary volume of air, which is accomplished with apparatus constructed and attached as shown. Approximately 45% of the heat produced by the combustion of gasoline in the engine is transferred to the cooling water at about 150 degrees F. The normal average consumption per running hour of about one gallon of gasoline, which contains approximately 120,000 B. t. u., causes the transfer of about 54,000 B. t. u. per hour to the cooling water. This is equal to the amount of heat given off by 216 feet of steam radiation which is sufficient to heat an average size house.

Air passing through the radiator is normally heated to between 100 and 110 degrees F., and is transferred to the body at this temperature in sufficient volume to cause a rapid air change therein, and by reason of its heat content above the temperature of the vehicle, liberates sufficient heat to maintain the passenger compartment at a comfortable temperature, such as 60 degrees F. in zero weather.

I have provided a device and a system which conveys the air to the body in the natural direction of flow induced by the movement of the vehicle and which does not materially interfere with the volumetric condition of the air leaving the radiator, thereby utilizing the velocity induced by movement of the vehicle or by the air movement outside of the vehicle; and which prevents the intermixture of the air inside the engine hood and in contact with the engine with the heating air, thereby eliminating the unpleasant odors given off by the engine and preventing the reduction in temperature of the heating air which would inevitably result from such intermixture. As a result I am able to inject a large volume of heated odorless air into the passenger compartment of the vehicle which will be sufficient to cause a rapid air change therein and to maintain a comfortable temperature.

In Fig. 1 I have shown a portion of a vehicle body comprising a front passenger compartment 10 and engine compartment 11 separated from the passenger compartment 10 by a dash 12 and enclosed by the hood or bonnet 13. A radiator 14 of the conventional type is positioned forwardly of the engine and at the forward end of the hood 13. The engine is of the conventional water cooled type in which water circulates therethrough and through the radiator 14 in which it loses its heat to air which is continuously passing through the radiator core. A fan 15 of the conventional type is mounted upon the forward end of the engine and operated thereby and designed to assist in the movement of air through the radiator 14.

My apparatus for transferring heated air from the radiator 14 into the passenger compartment 10, comprises a shroud pan 20, illustrated in Figs. 1 and 2, which abuts the rear face of the radiator and converges inwardly towards the engine. It will be noted that the top and upper side portions of the shroud enclose the fan in the form illustrated in Figs. 1 and 2. This shroud pan 20 is adapted to cause the air currents passing through the radiator 14 to converge toward a desired point. The upper rear side of the shroud 20 is provided with a funnel shaped outlet 21 which is provided with a belled end portion 22 shaped as a ball socket. This funnel shaped outlet comprises the forward end of a conduit 24 which is provided with a ball socket 23 positioned in the bell shaped end 22 of the funnel shaped member 21 in a manner adapted to permit a limited universal movement of the conduit 24 relative to the shroud 20.

The rear end of the conduit is provided with a second ball socket portion 25 which engages for universal movement with a cylindrical valve device 26 which extends through the dash 12 and is fixed thereto. A suitable manually controlled lever 27 may be provided on the dash for opening and closing the valve 26. This feature permits the discharge of the air passing through the conduit on the engine side of the dash when the valve is opened and into the passenger compartment when the valve is closed. The ball joint connection just described permits relative movement between the radiator 14 to which the shroud 20 is attached and the dash 12 to which the conduit 24 and valve 26 are attached, without straining the air conduit extending therebetween or entering the radiator core. This also permits convenient installation of the device as an accessory, in that it permits some latitude in positioning the valve member 26 relative to the dash 12. Any suitable type of valve may be used.

It is understood that it is not necessary to employ the ball socket joint in the form of the device shown in Figs. 1 and 2 of the drawing, but that a rigid connection between the shroud pan 20 and the conduit 24 may be made, as indicated in Fig. 5, if desired. The conduit 24 and its funnel shaped forward end 21 is attached to the rear upper edge and the upper side portions of the shroud so as to position the end of the conduit 24 immediately in the rear of the upper half of the fan 15.

I have illustrated a set of conventional radiator shutters 30 mounted on the front side of the radiator 14, which shutters are of the conventional type, well known in the art, and may be controlled manually from the dash by a rod 31 if desired. Such shutters may regulate the passage of air through the radiator 14 in order to control the cooling of the water in the radiator. I provide a means of controlling the volume of the air passing through said air conducting means which is responsive to the temperature of the air within the air conducting means, which comprises a thermostat 32 which is mounted at a suitable point in the air conducting means. This thermostat is responsive to the temperature of the heated air leaving the radiator and is connected by suitable linkage 33 with the radiator shutters 30. When the temperature rises to a given point, the thermostat 32 will be actuated to close the shutters 30 and when it drops to a predetermined point, the shutters will be opened, and thus control of the volume of air entering the radiator is had responsive to the temperature of the air within the air conducting means or to the temperature of the air leaving the radiator.

In the form of my invention illustrated in Fig. 2, the lower forward flared edge of the funnel portion 21 of the conduit 24 extends downwardly in the rear of the fan sufficiently close thereto to eliminate any substantial leakage of air therefrom or mixture of the air from the engine compartment therewith, as the direction of air currents produced by the fan relative to the fan blade are horizontal and at right angles thereto. This insures against the admission of any gaseous odors from the motor into the conduit. The fan will assist the movement of the air coming through the upper portion of the radiator, through the conduit 24 without permitting the air in the engine compartment to mix therewith. It is understood that the thermostat may be placed at any point within the air conducting means or at any point in which it will contact with the air warmed by the radiator. If it is desired to reduce the cross-sectional area of the air conducting means at or near the position of the fan or the head of the engine block on account of lack of space, the air conducting means may include a Venturi section, as shown in Figs. 1 and 2, which section may be incorporated in the construction of the ball and socket connection 22, 23 and the forward portion of the conduit 24. Such a construction, properly designed, will increase the velocity of air which passes through the restricted portion of the air conducting means.

In Fig. 5, I have shown a modified form of my invention in which the air conduit 24 is attached to the upper portion of the shroud pan 20 above the fan 15. In this modification the conduit 24 extends forwardly of the fan and has a pivoted lip 40 which is secured to the lower half of the conduit, which is adapted to be moved upwardly or downwardly, to regulate the volume of air passing into the conduit 24. This lip 40 may be automatically operated by a thermostat 32, as are the shutters of my previously described modification, in the manner illustrated in the drawing, or it may be operated by a manually controlled rod 41 extending forwardly to the dash 12 of the vehicle, the forward end of the rod having a pivoted connection with a link 42 which is fixedly attached to the pivot to which the movable lip 40 is secured. In this modification of my invention, the movable lip 40 is sufficiently close to the rear of the radiator core to prevent any material leakage or mixture of the air in the engine compartment with the air passing through the conduit 24.

The heater of my invention provides for the conducting of a large volume of heated air from the upper rear side of the radiator of an automotive vehicle directly to the passenger compartment without materially restricting the volume of the air discharged into it from the radiator, without the possibility of gases from the engine compartment mixing with the air which enters the passenger compartment.

What I claim is:

1. In a motor vehicle including a water cooled internal combustion engine, an air cooled radiator, and a closed body, a heating system for said body comprising the radiator, air conducting means connecting at least a portion of the inward side of said radiator directly with the interior of said body, said air conducting means providing a path of flow coinciding with the natural path of flow of air passing through said radiator, and being of a capacity adapted to convey without material restriction the volume of air discharged into it from said radiator and means responsive to the temperature of the air within the air conducting means for controlling the volume of air passing through said air conducting means.

2. In a motor vehicle including a water cooled internal combustion engine, an air cooled radiator, and a closed body, a heating system for said body comprising the radiator, air conducting means connecting at least a portion of the inward side of said radiator directly with the interior of said body and providing a path of flow coinciding with the natural path of flow of air through said radiator, and being of a capacity adapted to convey without material restriction the volume of air discharged into it from said radiator, and means responsive to the temperature of the air within the air conducting means for controlling the volume of air entering said radiator.

3. In a motor vehicle including a water cooled internal combustion engine, an air cooled radiator, and a closed body, a heating system for said body comprising the radiator, air conducting means connecting at least a portion of the inward side of said radiator directly with the interior of said body and providing a path of flow coinciding with the natural path of flow of air through said radiator, and being of a capacity adapted to convey without material restriction the volume of air discharged into it from said radiator, means for controlling the volume of air entering said radiator, and thermally responsive means positioned in the path of heated air leaving said radiator for actuating said controlling means.

4. In a motor vehicle including a water cooled internal combustion engine, an air cooled radiator, and a closed body, a heating system for said body comprising a radiator, air conducting means connecting at least a portion of the inward side of said radiator directly with the interior of said body, said air conducting means providing a path of flow coinciding with the natural path of flow of air passing through said radiator and including a restricted portion in the form of a Venturi tube for increasing the velocity of air passing through the restricted portion thereof, and means responsive to the temperature of the air within said air conducting means for controlling the volume of air passing through such air conducting means.

CHRISTIAN R. MUELLER.